Aug. 13, 1963  R. B. CLARK ET AL  3,100,422
HYDRAULIC ENGINE GOVERNOR
Filed July 17, 1959  3 Sheets-Sheet 1
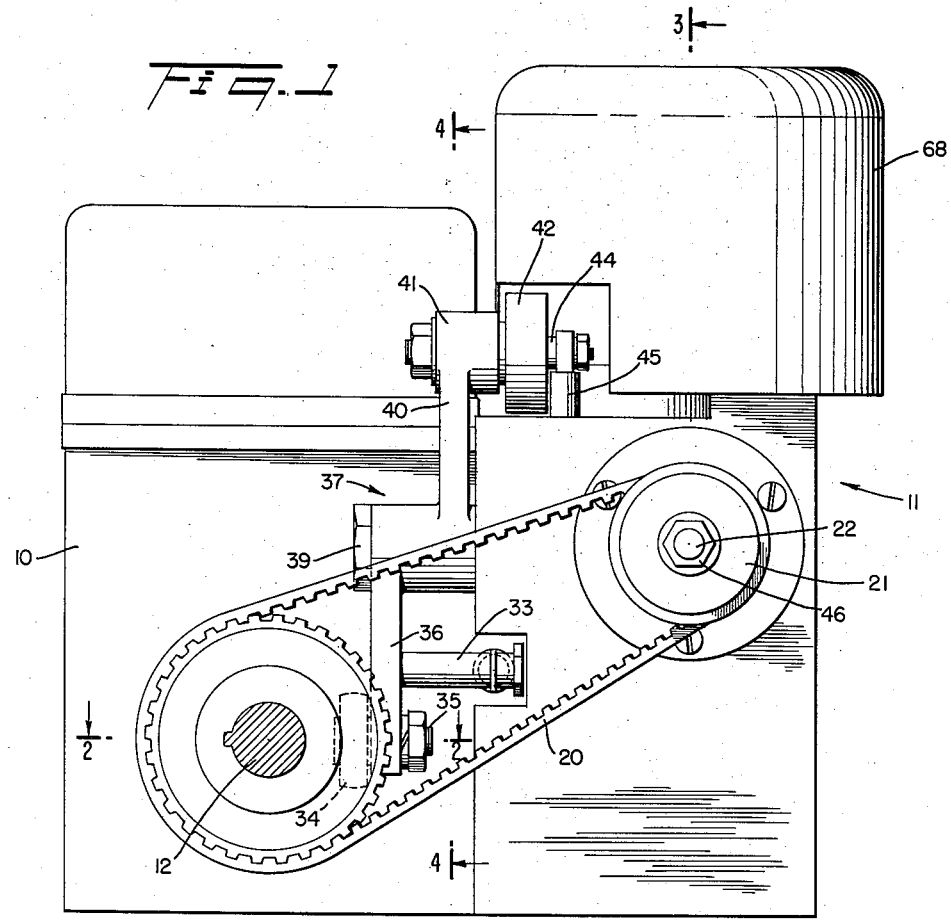
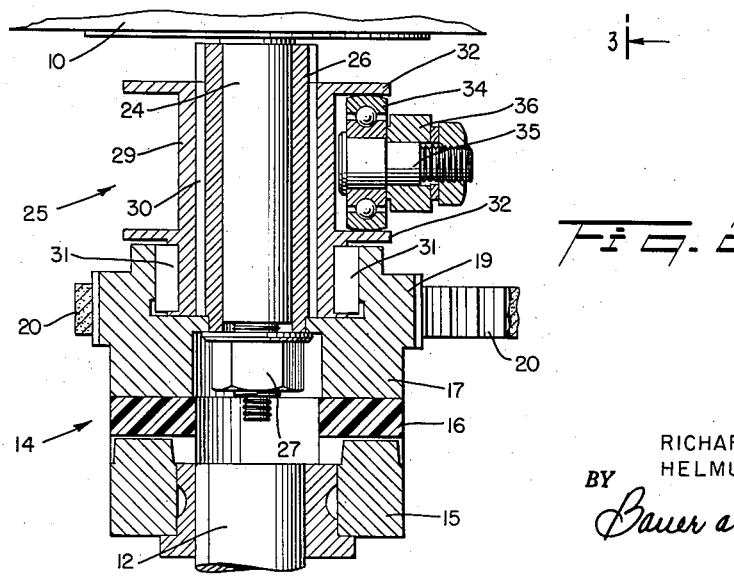
INVENTORS
RICHARD B. CLARK
HELMUT MEYER
BY
*Bauer and Seymour*
ATTORNEYS Aug. 13, 1963

R. B. CLARK ET AL 3,100,422

HYDRAULIC ENGINE GOVERNOR

Filed July 17, 1959

INVENTORS
RICHARD B. CLARK
BY  HELMUT MEYER

Bauer and Seymour
ATTORNEYS

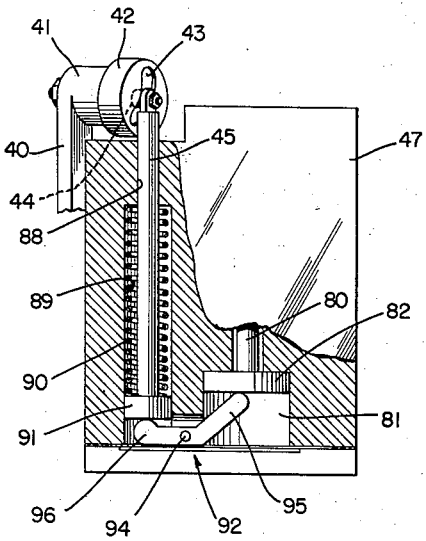
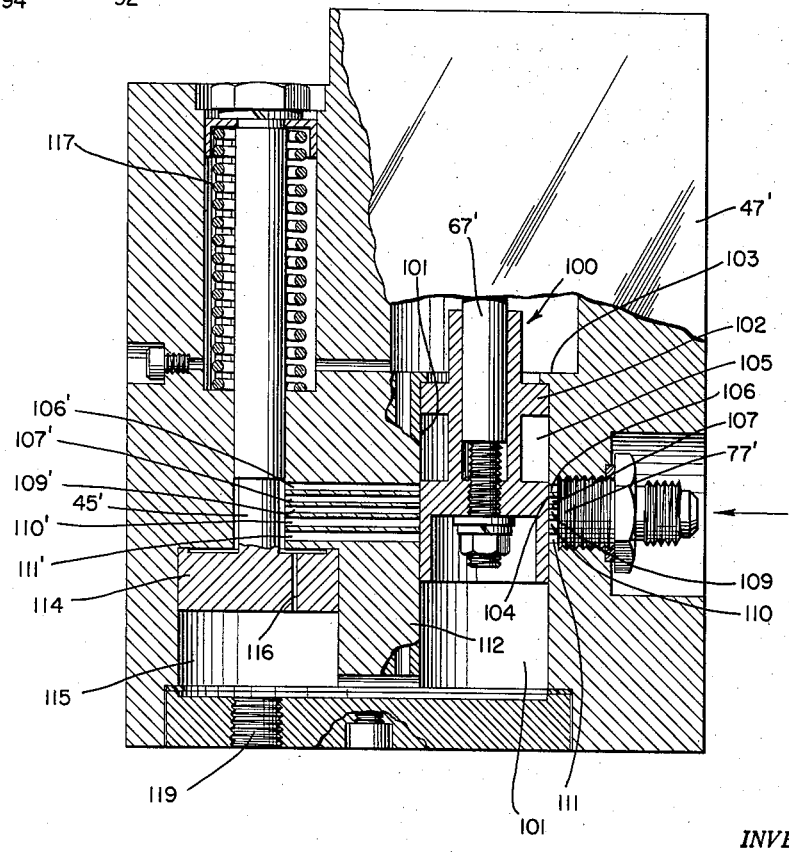
Aug. 13, 1963   R. B. CLARK ET AL   3,100,422
HYDRAULIC ENGINE GOVERNOR
Filed July 17, 1959   3 Sheets-Sheet 3
Fig. 5
Fig. 6
INVENTORS
RICHARD B. CLARK
HELMUT MEYER
BY Bauer and Seymour
ATTORNEYS

United States Patent Office 3,100,422
Patented Aug. 13, 1963

3,100,422
HYDRAULIC ENGINE GOVERNOR
Richard B. Clark and Helmut P. Meyer, Sidney, N.Y., assignors to The Bendix Corporation, a corporation of Delaware
Filed July 17, 1959, Ser. No. 827,822
7 Claims. (Cl. 91—19)

This invention relates to a novel mechanism for automatically controlling the degree of advance of the ignition of an engine. In the embodiment of the apparatus shown, the ignition advance control is relied upon for automatically maintaining a predetermined functional relationship between the speed of the engine and the degree of advance of the spark.

The control device of the invention is advantageously used, although obviously not limited to such application, in the automatic control of the spark advance of large, heavy, generally slow speed, engines. Typical engines of this type are those employed to drive the pumps of oil and gas pipe lines, such pumps being located at stations along the pipe line so as to forward the oil or gas under substantially constant pressure. Such engines are large and slow, generally running at a speed of from 175–200 r.p.m. As the speed of such engines varies, the most efficient engine operation requires varying the angular relationship between the crank shaft of the engine and the shaft of its spark distributor, which is driven by the engine in timed relationship with the crank shaft thereof. Because of the slow speed of the engine, and because the mass of the spark distributing device, which advantageously is a magneto, is large, spark controlling devices driven at engine speed and deriving their power from centrifugal force to vary the angularity between the engine crank shaft and the shaft of the magneto have not been successful. Among other difficulties, such prior devices are not able to change the angularity of the magneto shaft quickly enough to maintain the engine ignition under effective control.

It is among the objects of the present invention to provide a novel, simple, ignition control mechanism which automatically varies the degree of advance of the spark distributing mechanism of an engine.

Another object of the invention is the provision of an improved engine speed control mechanism which maintains a predetermined relationship between the speed of slow speed engines and the degree of spark advance.

Yet another object of the invention lies in the provision of an automatic ignition advance control unit which is powered by a servo-mechanism energized by power derived from the engine.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in end elevation of a magneto and of a spark advance controlling mechanism associated therewith, the view being taken from the point of view of a vertical transverse sectioning plane through the drive shaft for the magneto;

FIG. 2 is a fragmentary view in horizontal section through the apparatus of FIG. 1, the section being taken along the line 2—2 of FIG. 1, certain of the parts being shown in plan;

Figures 3, 4:
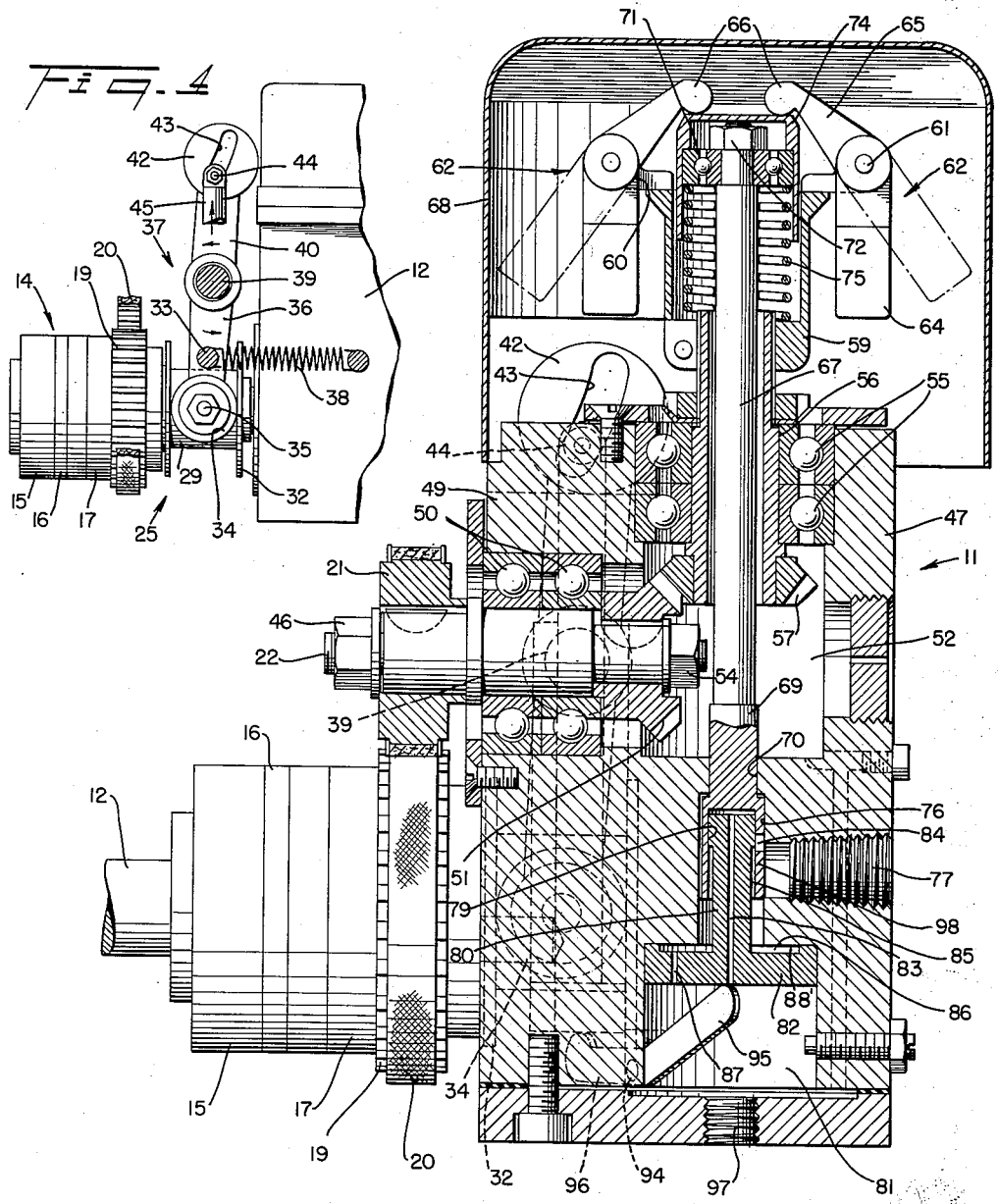
FIG. 3 is a view in vertical section through the apparatus of FIG. 1, the section being taken generally along the line 3—3, certain of the parts being shown in elevation.
FIG. 4 is a fragmentary view in vertical section through the apparatus of FIG. 1, the section being taken generally along the line 4—4 of FIG. 1, certain of the parts being shown in elevation.

FIG. 5 is a fragmentary view partially in vertical section and partially in perspective of the apparatus of FIGS. 1–4, inclusive, showing the mechanism connecting the operating piston of the servo-mechanism to the ignition-advancing arm of the control mechanism; and FIG. 6 is a fragmentary view in vertical axial section of a modified mechanism for controlling the advance of the ignition of an engine.

In FIG. 1 there is shown a magneto generally designated 10, a control mechanism 11 for adjusting the degree of advance of the magneto, and means for drivingly connecting control mechanism 11 to the means for driving the magneto. Such last means is in the form of a drive shaft 12 which is driven in synchronism with a shaft, such as the crank shaft or cam shaft of the engine, shaft 12 being driven at the requisite speed to deliver sparks with the proper timed relationship to the engine. As shown in FIG. 2, shaft 12 drives the magneto 10 through the medium of a flexible coupling 14. Coupling 14 has a first hub portion 15 keyed to the shaft 12, an intermediate flexible element 16, and a second hub portion 17 disposed coaxially of shaft 12 and of hub 15.

Integral with hub 17 of the coupling there is a sprocket 19 which meshes with a "timing belt" 20, which is also entrained over a driven pulley 21 which is keyed to the horizontal driven shaft 22 of the control unit 11 and is retained on the shaft by nut 46. The sprocket 19 somewhat exceeds sprocket 21 in diameter, so that shaft 22 rotates appreciably faster than shaft 12. As will be described in detail herein, shaft 22 drives a centrifugal speed detecting mechanism which determines the amount of thrust delivered by the servo-mechanism of control unit 11. Such mechanism, in turn, is applied to an angularly adjustable coupling 25, disposed in series with coupling 14, for changing the angularity between the driving shaft 12 and the main shaft 24 of magneto 10. It will be understood that the magneto includes both a current generating device and a spark distributing system for delivering the proper number of sparks in the proper timed sequence to the cylinders of the engine. A change in angularity between the engine shaft 12 and shaft 24 of the magneto thus changes the timing of the sparks in the cylinder of the engine in relation to the positions of the pistons in the cylinders. In the device shown, when the engine is slowed appreciably the sparks are automatically retarded, and when the engine speed increases the sparks are automatically advanced.

The angularly adjustable coupling 25 has a first or inner sleeve 26, which may be affixed to magneto shaft 24 with the desired angular relationship thereto by loosening retaining nut 27, turning sleeve 26 as required, and then tightening nut 27. Coupling 25 has a second, outer sleeve 29, which is telescoped over sleeve 26. Sleeves 26 and 29 have a helical spline and groove connection 30 of relatively small helix angle therebetween. Sleeve 29 is keyed to hub element 17 by longitudinally directed keyed elements 31, whereby sleeve 29 may be longitudinally shifted while retaining its driving relationship with coupling part 17.

The longitudinal position of outer coupling sleeve 29 is determined by the following control mechanism. Sleeve 29 has two axially spaced annular flanges 32 adjacent the respective ends thereof. A roller 34, which is in the form of the outer race of a ball bearing, is disposed between flanges 32 with its axis transverse to the axis of shaft 24.

The bearing of which race 34 is a part is affixed to the inner end of a stub shaft 35 which extends through the bottom end of a lever arm 36, and is secured thereto by a nut affixed to the threaded end of the stub shaft 35, as shown.

Arm 36 is the lower arm of a first-class lever 37, which is pivotally mounted generally at its mid-point on a horizontal pivot pin 39, extending from the frame of control unit 11. Lever 37 is constantly urged in a counterclockwise direction (FIG. 4) by a coil tension spring 38 extending from a fixed retaining means on the housing 12 of the magneto to a horizontal rod 33 extending laterally from the lower lever arm 36. The upper arm 40 of lever 37 has a boss 41 on its upper end, a drum shaped cam 42 being angularly adjustably affixed to the boss. Element 42 has a curved cam slot 43 in its outer face, such cam slot receiving a cam follower 44 in the form of a roller attached to the upper end of a vertical push rod 45.

Push rod 45 is thrust upwardly from the lower terminal position thereof shown in FIG. 5 in amounts which are proportional to the speed of the engine. The mechanism by which rod 45 is thus positioned will be described in detail hereinafter. It will be seen, upon considering FIGS. 4 and 5, that as push rod 45 rises in response to increased speed of the engine the cam follower 44 on rod 45 coacts with cam slot 43 so as to turn lever 37 counterclockwise, thus to thrust outer sleeve 29 of coupling 25 toward the magneto. The direction of inclination of the helical spline and groove connection 30 between sleeves 26 and 29 is such that as sleeve 29 travels to the right in FIG. 4, the magneto shaft 24 is turned forwardly with respect to the direction of rotation of engine shaft 12, so that the spark energy delivered by magneto 10 is advanced.

Turning now to FIGS. 3 and 5, the first embodiment of the construction of the speed detecting and spark advance controlling unit of the invention will be described. Unit 11 has a hollow casing 47, which may conveniently be made, for example, as a casting. The left hand wall 49 of such casing is relatively thick and has a central horizontal passage therethrough in which are affixed ball bearings 50 which journal the shaft 22. On the inner end of shaft 22, within a central cavity 52 in the housing, a bevel gear 51 is keyed to shaft 22 and is secured by a retaining nut 54. Within a vertically directed passage in housing 47 there are two ball bearings 55, which journal a vertically extending sleeve 56. Sleeve 56 carries on its inner, lower end a bevel gear 57 which meshes with the aforesaid bevel gear 51 on shaft 22.

It will be seen that sleeve 56 is driven in timed relationship with engine shaft 12 through coupling 14, timing belt 20, shaft 22, and bevel gears 51 and 57. On the top of sleeve 56 there is secured a centrifugal weight arrangement which is responsive to changes in speed of rotation of sleeve 56. Such arrangement takes the form of a cage 59 which is clamped to the upper end of sleeve 56, such cage having oppositely directed bifurcated ears 60 upon which are mounted weighted arms 62 by means of pivot pins 61. The lower ends 64 of arms 62 are heavier than the upper ends 65 thereof, so that as the cage and weighted arms rotate, centrifugal force impels the upper ends of the arms inwardly with a force which is generally proportional to the square of the speed of rotation.

The upper ends of arms 62 are rounded at 66 and bear upon the upper closed end of a generally inverted cup-shaped member 74. Member 74 is rotatably carried axially of sleeve 56 through the medium of a vertical push rod 67 which extends upwardly through sleeve 56 coaxially thereof, as shown. Rod 67 is constantly urged into the upper terminal position thereof, shown in FIG. 3, by means of a coil compression spring 75, the lower end of which abuts the outer race of a ball bearing 71 affixed to the upper end of rod 67 by a nut 72. The inverted cup member 74 is carried upon the upper surface of the outer race of bearing 71. The speed-detecting centrifugal weight arrangement is covered by an inverted cup-shaped guard housing 68.

In the embodiment of control unit shown in FIGS. 3 and 5, the push rod 67 is connected to a combined valve and piston device which is subjected to substantially constant fluid pressure. The degree of axial deflection of push rod 67 determines the rate of entry of fluid under pressure to the cylinder space, from which fluid is allowed to escape at a substantially constant rate. Thus the amount of deflection of push rod 67 determines the amount of thrust imposed on the push rod 45 by the piston, thereby to determine the degree of advance of the spark delivered by the magneto in the manner above described.

Turning now to FIG. 3, it will be seen that, adjacent its lower end, rod 67 has an enlarged circular cylinder portion 69 which accurately fits within a guiding bore 70 in housing 47. Below bore 70 the housing has a somewhat larger bore 76 coaxial thereof; the lower end of rod 67 is enlarged and accurately fits within bore 76. A laterally directed inlet port 77 extends through the housing wall and into communication with bore 76. Inlet port 77 is conveniently connected to the source of pressure of lubricating oil of the engine, such lubricating oil being maintained under substantially constant pressure during regular operation of the engine, as by a spring-loaded relief valve.

The lower end of rod 67 cooperates with piston 82 which accurately fits and reciprocates within a circular cylinder bore 81 in the lower end of the housing 47. Piston 82 has a vertically extending central stem 80 which extends within a central bore 79 at the lower end of rod 67 and has sliding sealed engagement therewith. Somewhat below its upper end stem 80 is of somewhat reduced diameter, as shown, whereby to provide a radially thin annular channel 85 which opens downwardly into the bore 76 above piston 82. A relatively small radially directed opening 84 extends through the skirt 98 on the lower end of rod 67, the lower edge of opening 84 slightly overlapping the radially thin annular passage 85. The stem 80 and the piston 82 have an axially directed passage 83 therethrough which permits the space between the upper end of stem 80 and the bore 79 to communicate with space 81 in the housing so as to exhaust oil which may have leaked into the space above the stem 80. When the prime mover is idling, rod 67 and piston 82 have the positions shown in FIG. 3, the upper rim of the piston engaging the surface 88' at the upper end of bore 81, and the upper end of stem 80 lying slightly spaced from the upper end of the bore 79.

When the rod 67 is in the position shown in FIG. 3, oil under pressure enters port 77, flows through opening 84, downwardly through passage 85, and by means of the annular recess 86 subjects a substantial part of the upper face of piston 82 to fluid pressure. A relatively small hole 87, of predetermined effective cross sectional area, is provided through piston 82 so that space 81 communicates therethrough with recess 86. The bottom portion of cylinder 81 is constantly drained through an opening 97 so as to prevent the build-up of oil under pressure therein.

When the engine is idling, the parts of the control unit occupy substantially the positions shown in FIG. 3. The rate of flow of oil into the space above piston 82 is at least balanced by the rate of escape of the oil through passage 87, so that the oil imposes substantially no downwardly directed force upon piston 82. The piston 82 is then held in its uppermost position (FIGS. 3 and 5) by the lever arm 95 which, in turn, is held in the position shown by a spring 90 acting through the head 91 of rod 45 and the lever arm 96, in a manner to be explained. When, however, the speed of the engine increases, weighted arms 62 thrust rod 67 further downwardly, thereby opening more of passage 84 to port 77. Under such circumstances, the rate of flow of oil into the chamber above piston 82 exceeds the rate of escape of oil therefrom, so that the piston 82 is moved downwardly against the opposition of spring 90. Push rod 45, which is guided at its lower end in a bore 88 in housing 47, has an enlarged lower end 91 which is slidably guided in an enlarged bore 89 in the housing. The above-mentioned coil compression spring 90, which is disposed between enlargement 91 and the end of bore 89 in the housing, constantly urges push rod 45 in a downward direction.

Motion is transmitted from piston 82 by means of a bell-crank 92 which is journalled on a horizontal pivot pin 94, as shown. One arm 95 of the bell-crank extends within chamber 81 to a position generally centrally beneath piston 82. The other arm 96 of the bell-crank extends to a position generally centrally beneath the enlarged end 91 of push rod 45. The parts are of such size and are so disposed that when push rod 45 is in its lower terminal position piston 82 is in its upper terminal position, and the respective arms of bell-crank 92 engage the parts so that there is substantially no lost motion between them. Thus even a slight motion of piston 82 downwardly from its upper terminal position of FIG. 3 is instantly transmitted without loss to thrust rod 45 and by it to adjustable coupling 25, whereby to change the degree of advance of the magneto as required. After the piston 82 has been thus thrust downwardly, as described, a subsequent lowering of push rod 67, caused by an increase in engine speed, exposes a greater area of opening 84 to passage 85. Such lowering of push rod 67 causes the oil entering through port 77 to exert an increased displacing force on piston 82; as a consequence, stem 80 laps opening 84 and locks the oil in the chamber above piston 82. There is thus a constant interplay between the rod 67, the piston 82, and the valve formed between the rod and piston, so that the instantaneous position of piston 82, in conditions of equilibrium of the degree of advance of the magneto and the position of rod 67 has a predetermined relationship to the actual position of rod 67 and thus to the speed of the prime mover.

In FIG. 6 there is fragmentarily shown a modified servo-mechanism which may be used in place of the servo-mechanism which has been described above in connection with FIGS. 1–5, inclusive. The basic differences between the mechanism of FIG. 6 and that of FIGS. 1–5, inclusive, are (1) that in the first described mechanism the portion of the apparatus made up of the bottom end of rod 67, piston 82, and stem 80 thereof functions as both a valve and a thrust-exerting piston, and (2) that the thrust rod 45' connected to adjustable coupling 25 functions in a manner opposite from rod 45 of FIGS. 1–5, inclusive. In FIG. 6 the element connected to the bottom end of a vertical thrust rod (which rod corresponds generally to rod 67 of the first embodiment) functions only as a valve, such valve directing fluid such as oil under substantially constant pressure to operate a piston of a separate servo-mechanism, the position of the valve determining the rate of flow of fluid to the piston. Further, in FIG. 6 thrust rod 45' moves downwardly as engine speed increases.

Turning now to FIG. 6, the casing of the control unit, designated 47', has a laterally directed fluid inlet port 77' therein. Casing 47' has a guide means (not shown) for the vertically disposed thrust rod 67', and has a centrifugal weight arrangement (also not shown) similar to arrangement 59, 62, etc. of the first embodiment associated therewith. Secured to the bottom end of thrust rod 67' and vertically reciprocable therewith is a valve element 100. Valve element 100 has an upper narrow flange or land 102 and a lower broader land 104. Such valve element accurately fits within a vertically disposed circular cylindrical chamber 101 in housing 47'. Valve element 100 is shown in its uppermost (idle) position, wherein it is retained against upward travel by a flange 103 acting as a stop means. At the inner end of port 77' is a series of vertically disposed horizontal openings 106, 107, 109, 110, 111, which selectively communicate with the space 105 between the lands 102 and 104 of the valve element as such valve element is progressively lowered. In the position of the valve element shown in FIG. 6, all of such passages are closed by land 104 of the valve element.

A vertically disposed thrust rod 45', which generally corresponds to rod 45 of the first described embodiment, is mounted for vertical reciprocation in guide members in housing 47', as shown. Integrally connected to the bottom end of rod 45' is a piston 114, which accurately fits within a circular cylindrical chamber 115 in the lower end of housing 47'. Thrust rod 45' and piston 114 are constantly urged toward the upper terminal position thereof shown in FIG. 6 by a coil compression spring 117. The wall 112 between the chamber 101 and the portion of the vertical passage in housing 47' above piston 114 are connected by a series of horizontal passages 106', 107', 109', 110', and 111', which correspond in size and vertical positioning to the passages immediately adjacent port 77' which are correspondingly numbered without primes. The portion of thrust rod 45' immediately above piston 114 is of somewhat reduced diameter, whereby to allow fluid to flow freely from passages 106', 107', 109', 110', and 111' into the space above the piston 114. The upper surface of piston 114 is annularly recessed as shown so that such fluid under pressure may have initial access to a substantial portion of the upper surface of the piston. Piston 114 is provided with a drain passage 116 therethrough, the fluid which has drained into chamber 115 being allowed to flow therefrom through opening 119.

The connection between the upper end of thrust rod 45' and angularly adjustable coupling 25 in the magneto drive is substantially the same as that in the embodiment of FIGS. 1–5, inclusive, and consequently is not shown. The connection shown in FIGS. 4 and 5 between arm 40, cam drum 42, cam slot 43, and cam follower 44 may readily be adapted to the device of FIG. 6 by turning the cam drum 42 substantially 180° about its axis, so that arm 40 will be moved counterclockwise as thrust rod 45' moves downwardly.

The mechanism of FIG. 6 functions as follows: When the engine is at rest or idling, the parts have the relative positions shown. When the engine is brought up to normal operating speed, the centrifugal weight arrangement (not shown) cooperating with the top of rod 67' depresses such rod and valve element 100 attached thereto so as to uncover a predetermined number of the passages 106, 107, 109, 110, and 111. Fluid under pressure, therefore, flows at a rate determined by the position of valve 100 into the space above piston 114, and by exerting a predetermined downward thrust upon rod 45' positions the adjustable coupling 25 accordingly. When the speed of the engine is increased, valve element 100 descends still further, thereby allowing fluid to be delivered at an increased rate to the upper surface of piston 114. This depresses rod 45' and adjusts coupling 25 so as to advance the ignition further. The converse operation takes place when the engine speed is decreased.

The enlarged diameter of the upper portion of rod 45' provides for a lapping action in the mechanism of FIG. 6. As piston 114 descends, the exit opening of the horizontal passage 106', 107', and so forth are lapped by the enlarged diameter of the rod 45' shown above passage 106' in FIG. 6, thereby locking the oil in the chamber above piston 114. Such chamber, however, is constantly open to the drain opening 119 through the passage 116, and so after sufficient oil has leaked from the chamber above the piston, the piston is again free to rise under the action of spring 117 so that communication between such chamber and the source of oil pressure is again established when the plunger on rod 67' is in position to uncover one of passages 106', 107', and so forth. Thus, in the embodiment of FIG. 6, as in the first described embodiment, there is a predetermined relationship between the position of piston 114 and the speed of the prime mover under conditions of equilibrium of the degree of advance of the magneto and the position of rod 67'.

Although only a limited number of embodiments of the invention have been illustrated in the accompanying drawings and described in the foregoing specification, it is to be expressly understood that various changes, such as in the relative dimensions of the parts, materials used and the like, as well as in the suggested manner of use of the apparatus of the invention, may be made without departing from the spirit and scope of the invention as will now be apparent to those skilled in the art.

What is claimed is:

1. In apparatus including a controllable prime mover and a servo-mechanism for controlling the prime mover, the improved servo-mechanism comprising a casing having a bore therein, a valve including a valve element reciprocable in said bore, means responsive to the speed of the prime mover for shifting the valve element, an inlet port in said casing adapted to be connected to a source of fluid pressure, the inlet port being opened to varying degrees in accordance with the position of the valve element, a piston in a bore in the casing, one side of the piston being subjected to the fluid admitted through the valve, a leakage port of a predetermined effective area through the piston, and means adapted to connect the piston to a controllable element of the prime mover.

2. Apparatus as defined in claim 1, wherein the valve element and the piston have cooperating parts movable relative to each other to form the valve, and the valve functions to remove the piston from communication with the source of fluid pressure when the controllable element reaches a condition of equilibrium with the means responsive to the speed of the prime mover.

3. Apparatus as defined in claim 2, wherein the valve element and the piston are disposed in the same bore in the casing, and the valve element and the piston have engaging parts movable relative to each other to form the valve.

4. Apparatus as defined in claim 2, wherein the valve element and the piston are separate elements, and the valve element and the piston are disposed in separate bores in the casing.

5. A servo-mechanism adapted for use with a prime mover, said mechanism comprising a casing having two bores therein, a valve including a valve element reciprocable in a first one of said bores, a speed responsive governing means for shifting the valve element, an inlet port in said casing communicating with the first bore and adapted to be connected to a source of fluid pressure, the inlet port being opened to varying degrees in accordance with the position of the valve element, a piston in the second bore in the casing, means providing communication between the first and second bores so that one side of the piston is subjected to the fluid admitted through the valve, a leakage port of predetermined effective area through the piston, and means adapted to connect the piston to a controllable element of the prime mover.

6. Apparatus as defined in claim 5, wherein the means providing communication between the first and second bores provides a fluid conducting path having an area which varies in proportion to the degree of opening of the inlet port.

7. Apparatus as defined in claim 6, wherein the means providing communication between the first and second bores comprises a series of passages arranged with their respective ends spaced along the lengths of the two bores, the valve element successively uncovering and opening the ends of the passages at the first bore as the valve element moves from its initial, at rest, position, and means connected to the piston to move therewith and progressively to cover and block the ends of the passages at the second bore as the piston moves from its initial, at rest, position.

References Cited in the file of this patent
UNITED STATES PATENTS

| | | |
|---|---|---|
| 1,257,630 | Newton | Feb. 26, 1918 |
| 2,117,891 | Kalin | May 17, 1938 |
| 2,162,243 | Browne | June 13, 1939 |
| 2,381,612 | Mallory | Aug. 7, 1945 |
| 2,392,680 | Mallory | Jan. 8, 1946 |
| 2,871,840 | De Claire et al. | Feb. 3, 1959 |
| 2,879,754 | Von Kienlin et al. | Mar. 31, 1959 |